June 26, 1956 B. W. ST. LEGER MONTAGUE 2,752,525
PROTECTION CIRCUIT FOR CATHODE RAY TUBES
Filed Sept. 10, 1952
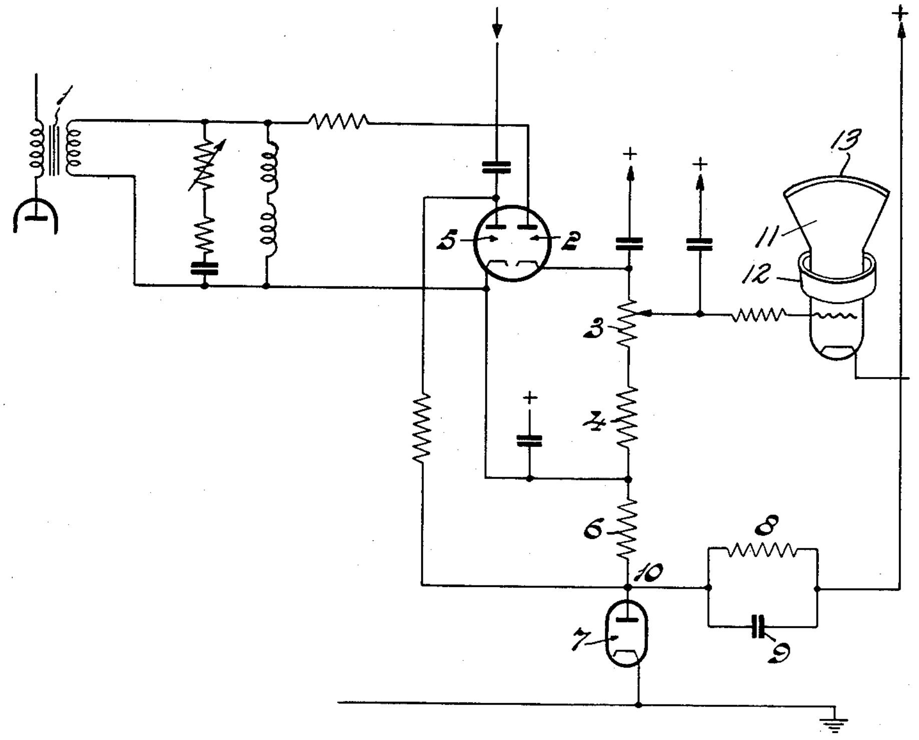
INVENTOR
Bryan William St. Leger Montague
BY Fred M Vogel
AGENT United States Patent Office 2,752,525

Patented June 26, 1956

2,752,525

PROTECTION CIRCUIT FOR CATHODE RAY TUBES

Bryan William St. Leger Montague, Chipstead, England, assignor to Hartford National Bank and Trust Company, Hartford, Conn., as trustee Application September 10, 1952, Serial No. 308,760

Claims priority, application Great Britain September 24, 1951

1 Claim. (Cl. 315—20)

The invention relates to television receivers and more particularly to an arrangement for protecting the screen of the cathode-ray tube in such a receiver under fault conditions.

In known arrangements, employing cathode-ray tubes requiring magnetic focussing, it is customary to focus the scanning beam in one of three ways.

(*a*) By means of a focus coil, the current for which is supplied by series or parallel connection to one of the high tension supplies.

(*b*) By the use of a permanent magnet assisted by a small auxiliary focus coil, the current through which can be varied to provide an adjustment of the focussing of the scanning beam.

(*c*) By means of a permanent magnet alone, adjustment of focus being effected by a mechanical arrangement for varying the gap in the magnet circuit.

Using methods (*a*) or (*b*), the scanning spot is defocussed when the high tension supply voltage falls appreciably and consequently if the focus coil is supplied from the same source as supplies the high tension to the valves in the scanning beam deflection circuit, switching off of the receiver or failure of the said high-tension supply does not lead to damage of the screen of the cathode ray tube due to the dissipation of the charge stored in the extra high-tension supply over a small area of the cathode-ray tube screen.

Using method (*c*) however, particularly with a cathode-ray tube which is normally run at a high rate of energy dissipation such as one used in large screen projection television systems the collapse of the scanning beam deflection fields results in the stored energy of the extra high tension supply being discharged initially into a focussed spot on the screen, unless provision is made to effect a substantial portion of the discharge during the period when the deflection fields are collapsing. In this latter case, the voltage of the extra high tension supply will then have fallen sufficiently for the beam to be defocussed by the time it has ceased to be deflected and no damage to the fluorescent screen of the cathode-ray tube will result. This can usually be arranged by suitable connection of the cathode-ray tube decoupling capacitors, and safeguards the tube during the switching-off procedure.

However, in the case when an auxiliary circuit is used to protect the cathode-ray tube in the event of a line and/or frame time base failure, certain difficulties arise in the use of the focussing system (*c*). In a known auxiliary protection circuit, voltage pulses from the line and frame time bases are rectified in a double diode valve and the resultant positive D. C. voltages are applied in series to the potentiometer chain supplying the grid of the cathode-ray tube, the cathode of the tube being at a higher positive potential than the grid.

In the event of failure of one or both time bases, the corresponding rectified voltage(s) disappear and the grid of the cathode-ray tube falls in potential, cutting off the beam current in the tube. If now the receiver is switched off, the high-tension voltage falls rapidly to zero and the tube is left without bias and with, at most, only one collapsing deflection field. It is quite possible for there to be a simultaneous failure of both line and frame time bases, for it is common practice for the line time base oscillator and frame time base amplifier valve to be incorporated in one envelope.

Thus, in the worst case, the stored energy of the extra-high-tension supply is discharged into a focussed spot and damage to the cathode-ray tube screen will result.

The object of the invention is to protect the screen of the cathode-ray tube under the conditions of time-base failure and switching off detailed above.

According to the invention a television receiver having permanent magnet focussing of the cathode-ray tube and means for cutting off the beam current of the tube in the event of time base failure comprises a uni-directional conducting device such as a thermionic diode so arranged and connected as to isolate the control grid circuit of the cathode-ray tube and to provide a negative bias for the control grid for a period long enough to enable the cathode-ray tube heater to cool down and cease to emit when the receiver is switched off.

In order that the invention may be more clearly understood it will now be described with reference to the accompanying drawing which shows the cathode-ray tube protection circuit according to the invention.

In the drawing the line transformer 1 besides feeding the line deflection coils supplies pulses to the diode 2 whose load comprises potentiometer 3 and resistor 4 across which a rectified direct current voltage appears. The diode 5 is supplied with pulses from the frame time base which produce a rectified direct current voltage across resistor 6. Thus under the normal operating conditions there is a steady direct current voltage across the resistor chain 3, 4, 6 and since the cathode of the cathode-ray tube is held at a potential higher than that at the top of potentiometer 3, the slider of this potentiometer provides an adjustment of the negative bias applied to the cathode-ray tube grid.

The diode 7 is held in conduction by the bleeder current through resistor 8 to the high tension line, and the voltage across 7 is negligible. Under these conditions, capacitor 9 becomes charged almost to the full high tension voltage.

If now one or both of the time base circuits should fail, part or all of the voltage appearing across the resistor chain 3, 4, 6 will be removed and the cathode-ray tube grid will be driven negative, cutting off the beam current. Upon switching off the receiver the high tension line will fall rapidly to earth potential driving the point 10 negative, since the time constant of the resistor-capacitor circuit 8, 9 is made large by giving resistor 8 a high value. The diode 7 will be cut off and when the high tension voltage is zero a state of affairs will exist wherein the point 10 will be held negative with respect to earth by the voltage across the capacitor 9, which latter will discharging through the resistor 8. By making the time constant of 8 and 9 sufficiently high, the cathode-ray tube is held beyond cut-off until the tube heater has cooled sufficiently to prevent emission and hence the discharge of the extra high tension supply into a focussed spot on the cathode-ray tube screen is inhibited. The cathode-ray tube 11 is provided with a permanent magnet 12 for focussing the electron beam, in the well-known manner, and also is provided with a fluorescent screen 13.

Apart from the requirements of the time constant, the value of resistor 8 must be kept low enough to maintain a bleeder current through the diode 7 in excess of the maximum cathode-ray tube grid current likely to be encountered.

The invention is not limited to the use of a thermionic diode in 7; a dry plate rectifier or crystal diode may be used or an unused section of a valve used for another purpose, e. g. the suppressor grid of a radio frequency pentode.

What I claim is:

A television receiver comprising a cathode-ray tube having a fluorescent screen, a cathode and control grid assembly for producing an electron beam, and a permanent magnet for focusing said electron beam, means connected to apply a biasing voltage to said cathode, a resistance connected at an end thereof to said control grid, a diode having an anode connected to the other end of said resistance and having a cathode connected to electrical ground, a source of voltage which is of positive polarity with respect to electrical ground, a resistor and a capacitor connected in parallel combination, said combination being connected between said source of voltage and said anode, said source of voltage having a sufficiently high value to cause said diode to be conductive whereby current flows in said resistor thereby charging said capacitor with the resultant voltage drop across said resistor, a line deflecting circuit and a frame deflecting circuit, a first rectifier connected between said line deflecting circuit and a point on said resistance to produce a direct voltage on a portion of said resistance from the line deflecting signal, and a second rectifier connected between said frame deflecting circuit and a point on said resistance to produce a direct voltage on another portion of said resistance from the frame deflecting signal, said rectifiers being polarized so that each of said direct voltages contributes a positive-polarity component of bias voltage to said control grid whereby the sum of said direct voltages and the voltage at the anode of said diode apply a correct operating bias voltage to said control grid and whereby in the event of failure of either of said deflecting circuits the bias voltage at said grid will become reduced sufficiently to reduce the intensity of said electron beam to prevent it from damaging said screen, said parallel combination of a resistor and capacitor having a time constant sufficiently large so that, when said receiver is is turned off and said diode ceases to be conductive, the voltage charge on said capacitor will reduce the voltage at said control grid to reduce the intensity of said electron beam, thereby preventing it from damaging said screen, until said cathode has cooled sufficiently to substantially suppress said electron beam.

References Cited in the file of this patent

UNITED STATES PATENTS

| | | |
|---|---|---|
| 2,152,821 | Schlesinger | Apr. 4, 1939 |
| 2,153,216 | Urtel | Apr. 4, 1939 |
| 2,222,943 | George | Nov. 26, 1940 |
| 2,280,670 | Spielman | Apr. 21, 1942 |
| 2,366,357 | Schlesinger | Jan. 2, 1945 |
| 2,421,520 | Poch | June 3, 1947 |
| 2,444,902 | Torsch | July 6, 1948 |
| 2,543,831 | Bushman | Mar. 6, 1951 |